United States Patent [19]

Espeland et al.

[11] Patent Number: 4,730,012

[45] Date of Patent: Mar. 8, 1988

[54] BUILDING MATERIAL COMPOSITION

[76] Inventors: Arthur J. Espeland, P.O. Box 477, Jewell, Iowa 50130; Theodore R. Stekhuizen, 11253-66th St. N., Pinelass Park, Fla. 33565

[21] Appl. No.: 904,545

[22] Filed: Sep. 4, 1986

Related U.S. Application Data

[63] Continuation of Ser. No. 785,613, Oct. 9, 1985, abandoned.

[51] Int. Cl.$^4$ .......................... C08K 13/02; C08K 7/14
[52] U.S. Cl. .................................... 523/505; 523/509; 523/514; 523/527
[58] Field of Search ............... 523/514, 509, 521, 505; 524/13

[56] References Cited

U.S. PATENT DOCUMENTS

| | | | |
|---|---|---|---|
| 3,423,224 | 1/1969 | Schmidt et al. | 523/514 |
| 3,433,761 | 3/1969 | Holle | 523/514 |
| 3,959,203 | 5/1976 | Keil | 523/511 |
| 4,102,944 | 7/1978 | Fukuyama et al. | 523/514 |
| 4,212,790 | 7/1980 | Ibata et al. | 523/514 |
| 4,281,071 | 7/1981 | Fearing et al. | 523/514 |
| 4,346,050 | 8/1982 | Trent et al. | 523/514 |
| 4,374,215 | 2/1983 | Atkins | 523/514 |
| 4,409,344 | 10/1983 | Moulson et al. | 523/514 |
| 4,529,757 | 7/1985 | Iseler et al. | 523/514 |

FOREIGN PATENT DOCUMENTS

| | | | |
|---|---|---|---|
| 55-10556 | 2/1980 | Japan | 523/514 |
| 57-151611 | 9/1982 | Japan | 523/514 |

*Primary Examiner*—Lewis T. Jacobs
*Attorney, Agent, or Firm*—Zarley, McKee, Thomte, Voorhees & Sease

[57] ABSTRACT

A building material composition comprises a mixture of a styrenated unsaturated polyester with hydrated alumina at a ratio of one part by volume polyester to 0.5 to one part hydrated alumina. The mixture is cured by adding a methyl ethyl Ethyl ketone peroxide as a catalyst. Other ingredients, such as dry clean sand, perlite, and/or calcium carbonate may be added to the mixture prior to the addition of the catalyst. The resulting composition exhibits superior strength characteristics as a building material.

3 Claims, No Drawings

BUILDING MATERIAL COMPOSITION

This is a continuation of application Ser. No. 785,613, filed Oct. 9, 1985, now abandoned.

BACKGROUND OF THE INVENTION

This invention relates to a building material composition.

One of the basic materials used for construction is concrete or mortar made from Portland Cement. These materials have certain limitations, however, in their ability to withstand compressive forces and tensile forces. Cement is also limited in its ability to exhibit great bonding strength between the cement and other objects such as reinforcing rods.

Concrete made from Portland Cement has very little flexibility, and therefore this material is limited in its ability for use in applications where flexibility is required. Concrete made from Portland Cement often cracks when exposed to flexing forces.

Various types of plastics have been utilized as substitutes for concrete. These plastics provide flexibility and in some cases added strength, but they are very expensive to produce in large quantities. Furthermore, their ability to withstand compressive and tensile forces is in many cases limited.

Therefore, a primary object of the present invention is the provision of an improved building material composition.

A further object of the present invention is the provision of a composition which can be economically produced in large quantities and which can be used as a substitute for Portland Cement.

A further object of the present invention is the provision of a composition which has compressive strength many times greater than Portland Cement.

A further object of the present invention is the provision of a composition which has tensile strength many times greater than Portland Cement.

A further object of the present invention is the provision of a composition which provides flexural strength, greater than Portland Cement, and which is more flexible and less brittle than Portland Cement.

A further object of the present invention is the provision of a composition which is fire retardant, heat resistant, and inflammable.

A further object of the present invention is the provision of a composition which has superior resistance to deterioration when exposed to water, salt water, or other corrosive chemicals.

A further object of the present invention is the provision of a composition which is capable of improved bonding strength between the composition and other objects, such as reinforcing rods.

A further object of the present invention is the provision of a composition which can be easily formed into irregular shapes needed for construction.

A further object of the present invention is the provision of a composition which is economical to produce, durable in use and efficient in operation.

SUMMARY OF THE INVENTION

The present invention includes a styrenated unsaturated polyester mixed with hydrated alumina. One part by volume of the polyester is mixed with 0.5 to one part by volume hydrated alumina. A methyl ethyl ketone peroxide (MEK) is added as a catalyst to the mixture of polyester and hydrated alumina, and the mixture is permitted to cure and harden.

Various aggregates may be added to the above mixture prior to the addition of the MEK catalyst. For example, a mixture of dry clean sand, styrenated unsaturated polyester, and hydrated alumina, mixed by volume at a ratio of 1:1:1 prior to the addition of the catalyst will produce a medium heavy, very strong, composition. A lighter weight composition can be obtained by mixing one part styrenated unsaturated polyester with one part perlite and one-half part hydrated alumina prior to the addition of the MEK catalyst. This results in a lightweight composition which is very strong.

A very heavy composition may be obtained by mixing one part styrenated unsaturated polyester with one-half part hydrated alumina, one-half part calcium carbonate, and one-half part dry cleaned sand. This produces a very heavy composition which is not quite as strong as the medium mixture referred to above.

The above composition produces a material which is several times stronger than concrete with respect to compressive forces, tensile forces, and flexural forces. Furthermore, the material is fire resistant, and when exposed to very hot flames, will be self-extinguishable whenever the flames are removed The composition is particularly resistant to salt water or other corrosive substances, and therefore is superior to concrete in applications where the material will be exposed to corrosive substances.

The material is flexible in response to shock, and is not as brittle as concrete. Furthermore, it has a bonding strength which is comparable to or superior to that of concrete. Items embedded within the composition form a bond with the composition which is very strong.

One modified form of the invention utilizes bamboo as a reinforcement embedded within the composition. The bamboo is hollow and can be filled with glass fibers or in some cases the bamboo can be left hollow. When embedded in the composition, the bamboo is filled with the composition. This reults in an increased strength while at the same time improving the flexural properties of the cured composition.

DETAILED DESCRIPTION OF THE PREFERRED EMBODIMENTS

The preferred unsaturated styrenated polyester of the present invention may be purchased from Ashland Chemical Company, Columbus, Ohio, under the model designation 301. The resin is purchased in a homogenized state or the resin may be homogenized after it has been purchased.

The methyl ethyl ketone peroxide (MEK) is adjusted in amount according to the temperature at which the mixture is being mixed. The illustrations below assume that the temperature is at approximately 75° F. However, as the temperature increases, the amount of MEK needed to cure the mixture is reduced, and as the temperature decreases, the amount of MEK required is increased.

The invention is further explained by the following non-limiting examples.

EXAMPLE #1

One part styrenated unsaturated polyester is mixed with one part by volume hydrated aluminum. The mixture is completely mixed so as to provide a complete homogeneous mixture before any catalyst is added. After mixing the resin and the hydrated aluminum a catalyst comprising one percent MEK peroxide is added. The one percent is based upon the total weight of the styrenated unsaturated polyester, and assumes a mixing temperature of approximately 75° F. A larger percentage of MEK is required at lower temperatures and a slightly smaller percent of MEK is required at higher temperatures.

The resulting composition is a medium density hard material which has the characteristics of very high compressive strength, tensile strength, sheer strength, flexural strength and elasticity. The composition is fire resistant, and is resistant to corrosive substances such as salt water.

EXAMPLE #2

One part by volume of the styrenated unsaturated polyester is mixed with one part hydrated alumina and one part dry clean sand. After these components have been mixed, a one percent MEK catalyst is added and the mixture is permited to cure and harden. This produces a medium dense material which produces superior strength relative to the other examples shown herein. Tests of various samples of the composition have shown an average compressive strength of 19,420 lbs. per square inch; an average tensile strength of 1,895 lbs. per square inch; an average shear strength of 5,936 lbs. per square inch; an average flexural strength of 2,475 lbs. per square inch; and an average modulus of elasticity of 78, 475.

EXAMPLE #3

A very heavy and dense composition may be obtained by mixing one part by volume styrenated unsaturated polyester with one half part hydrated aluminia, one half part calcium carbonate, and one half part dry clean sand. These components are mixed and the one percent MEK catalyst is added. The mixture is then permitted to cure and harden. While this particular composition is more dense than the one referred to above, it does not exhibit strength as great as Example #2 above. Various samples tested of this higher density composition showed an average compressive strength of 13,454 lbs. per square inch, a tensile strength of 2,308 lbs. per square inch, a shear strength of 10,764 lbs. per square inch, a flexural strength of 6,157 lbs. per square inch; and a modulus of elasticity of 85,355.

EXAMPLE #4

A light weight composition may be obtained for use in construction projects where maximum strength is not required but where light weight would be advantageous. This composition is made by mixing one part unsaturated styrenated polyester with one part perlite, and one half part hydrated alumina. The mixture is fully mixed and then one percent MEK is added. The mixture is permited to cure and harden resulting a very light weight product. Several samples of this product have been tested and show an average compressive strength of 6,060 lbs. per square inch, an average tensile strength of 845 lbs. per square inch, an average shear strength of 4,626 lbs. per square inch, an average flexural strength of 1,933 lbs. per square inch and an average modulus of elasticity of 50,830.

All of the above examples are fire resistant and heat resistant. Samples have been exposed to a temperature of 200° F. for a period of 31 hours and no change of appearance or texture has been observed. Samples were also subjected to a sixteen cycle freeze/thaw test which resulted in no loss in weight and no other visible deterioration other than a 0.2 percent dimensional variation between the freeze and thaw.

The composition of the present invention shows a superior bonding strength between reinforced steel or structural steel and the composition. When exposed to a blow torch, samples of the composition would not ignite so as to burn independently by themselves. Upon removal of the blow torch any flames were self-extinguishing.

The present invention produces a composition which resists absorption of water. Samples were exposed to 48 hours of cold water with a zero percent of absorption being observed.

The invention is also resistant to corrosive solutions. When samples were subjected to a three cycle ATM sodium sulfate soundness test they showed a weight loss ranging from 1.2 percent to 2.6 percent. This is to be compared to typical agregate which when subjected to the same test shows a percentage of loss as high as 18 percent.

When samples of the present invention were subjected to 40 hours of salt spray testing the percent of weight loss was approximately 0.1 percent and these was no visible external change.

One modified form of the invention utilizes bamboo as a reinforcement embedded within the composition. The bamboo is hollow and can be filled with glass fibers or in some cases the bamboo can be left hollow. When embedded in the composition, the bamboo is filled with the composition. This results in an increased strength while at the same time improving the flexural properties of the cured composition.

The present invention has the same advantage of concrete in that it can be poured and molded into various shapes needed for construction, similarly to the way concrete is molded. However, the present invention provides superior strength characteristics to that exhibited by concrete.

Thus it can be seen that the device accomplishes at least all of its stated objectives.

What is claimed is:

1. A building material composition made according to the method comprising:
    mixing a styrenated unsaturated polyester with hydrated alumina and dry clean sand at a ratio of 1:1:1, respectively, by volume;
    adding methyl ethyl ketone peroxide as a catalyst to said mixture of polyester, alumina and sand, said methyl ethyl ketone being approximately 1% by weight with respect to said polyester when the temperature of said mixture is approximately 75 degrees Fahrenheit; embedding bamboo within said mixture; said bamboo being filled with glass fibers;
    permitting said mixture to cure and harden after the addition of said catalyst, whereby said cured mixture will exhibit the following properties:
    compressive strength of approximately 19,400 psi,
    tensile strength of approximately 1,900 psi,
    shear strength of approximately 5,936 psi,
    flexural strength of approximately 2,475 psi,
    modulus of elasticity of approximately 78,475.

2. A building material composition made according to the following method comprising:
    mixing a styrenated unsaturated polyester with hydrated alumina, calcium carbonate, and dry clean sand at a ratio of 1:1/2:1/2:1/2, respectively, by volume;

adding methyl ethyl ketone peroxide as a catalyst to said mixture of polyester, alumina, calcium carbonate, and sand, said catalyst being approximately 1% by weight with respect to said polyester when the temperature of said mixture is approximately 75 degrees Fahreheit; embedding bamboo with said mixture;

said bamboo being filled with glass fibers;

permitting said mixture to cure and harden after the addition of said catalyst whereby said cured mixture will exhibit the following properties;
compressive strength of approximately 13,454 psi,
tensile strength of approximately 2,308 psi,
shear strength of approximately 10,764 psi,
flexural strength of approximately 6,157 psi,
modulus of elasticity of approximately 85,255.

3. A building material composition made according to the following method comprising:

mixing a styrenated unsaturated polyester with hydrated alumina and perlite at a ratio of 1:1/2:1, respectively, by volume;

adding methyl ethyl ketone peroxide as a catalyst to said mixture of polyester when the temperature of said mixture is approximately 75 degrees Fahrenheit; embedding bamboo within said mixture; and bamboo being filled with glass fibers;

permitting said mixture to cure and harden after the addition of said catalyst whereby said cured mixture will exhibit the following properties:
compressive strength of approximately 6,060 psi,
tensile strength of approximately 845 psi,
shear strength of approximately 4,626 psi,
flexural strength of approximately 1,933 psi,
modulus of elasticity of approximately 50,830.

* * * * *